(12) United States Patent
Minamizono

(10) Patent No.: US 8,928,904 B2
(45) Date of Patent: Jan. 6, 2015

(54) DATA PROCESSING APPARATUS HAVING A PRINTER DRIVER FOR CHANGING AN OUTPUT DESTINATION

(71) Applicant: Yuka Minamizono, Kanagawa (JP)

(72) Inventor: Yuka Minamizono, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/164,377

(22) Filed: Jan. 27, 2014

(65) Prior Publication Data

US 2014/0139861 A1 May 22, 2014

Related U.S. Application Data

(63) Continuation of application No. 13/771,501, filed on Feb. 20, 2013, now Pat. No. 8,675,217, which is a continuation of application No. 12/554,045, filed on Sep. 4, 2009, now Pat. No. 8,405,841.

(30) Foreign Application Priority Data

Sep. 17, 2008 (JP) .................. 2008-238561

(51) Int. Cl.
*G06F 15/00* (2006.01)
*G06F 3/12* (2006.01)
*G06K 15/02* (2006.01)

(52) U.S. Cl.
CPC ............ *G06K 15/181* (2013.01); *G06F 3/1224* (2013.01); *G06F 3/1245* (2013.01); *G06F 3/1222* (2013.01); *G06F 3/1298* (2013.01); *G06F 3/1204* (2013.01); *G06F 3/1261* (2013.01); *G06F 3/1297* (2013.01); *G06F 3/1288* (2013.01)
USPC ....................................... 358/1.13

(58) Field of Classification Search
USPC .......................................... 358/1.13
See application file for complete search history.

(56) References Cited

U.S. PATENT DOCUMENTS

| 2007/0035766 A1 | 2/2007 | Yamamura |
| 2007/0273923 A1 | 11/2007 | Kimura |
| 2008/0183837 A1 | 7/2008 | Lee et al. |
| 2008/0252910 A1* | 10/2008 | Cordesses et al. ............. 358/1.1 |

FOREIGN PATENT DOCUMENTS

| JP | 03-048358 | 3/1991 |
| JP | 09-146731 | 6/1997 |
| JP | 09-167067 | 6/1997 |
| JP | 2003-140367 | 5/2003 |
| JP | 2003-173250 | 6/2003 |
| JP | 2004-282273 | 10/2004 |
| JP | 2007-206970 | 8/2007 |
| JP | 2007-304710 | 11/2007 |
| JP | 2007-317088 | 12/2007 |

OTHER PUBLICATIONS

Japanese Office Action dated Oct. 2, 2012.

* cited by examiner

*Primary Examiner* — Saeid Ebrahimi Dehkordy
(74) *Attorney, Agent, or Firm* — IPUSA, PLLC

(57) ABSTRACT

An application mounted in a data processing apparatus creates a document and issues a print request of the document. A printer driver receives the print request and creates print data by setting a format of the document as a specific format of model dependency, and changes a default output destination of the print data into a changed output destination. A spooler receives the print data and sends the print data to one of a plurality of image forming apparatuses designated by the changed output destination through a network interface.

12 Claims, 13 Drawing Sheets

FIG.5

| IMAGE FORMING APPARATUS | HOST NAME | IP ADDRESS | OUTPUT PORT NAME |
|---|---|---|---|
| MFP1 | A | 192.68.2.1 | PORT A |
| MFP2 | B | 192.68.2.2 | PORT B |
| PRT3 | C | 192.68.2.122 | PORT C |
| PRT4 | D | 192.68.19.1 | PORT D |
| MFP5 | E | 192.68.19.3 | PORT E |
| ... | ... | ... | ... |

FIG.7

| KEYWORD 710 | HOST NAME 720 | IP ADDRESS 730 | OUTPUT PORT NAME 740 |
|---|---|---|---|
| INVOICE | A | 172.68.2.1 | PORT A |
| BILL | B | 172.68.2.2 | PORT B |
| MEDICATION INSTRUCTION SLIP | C | 172.68.2.122 | PORT C |
| MEDICAL SERVICE RECEIPT | D | 172.68.17.1 | PORT D |
| ... | ... | ... | ... |

700

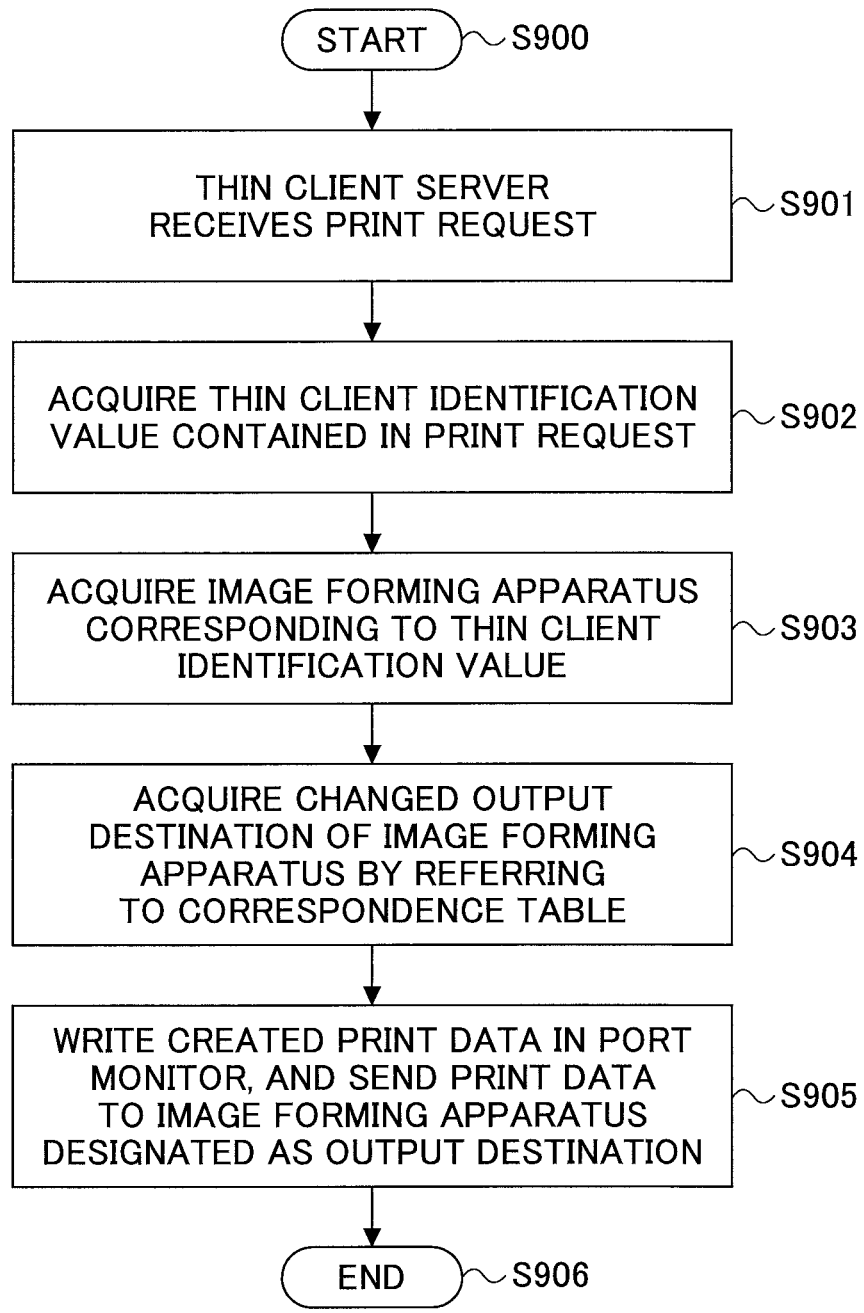

FIG.10

Job Detection – Output Condition Setting

| Keyword | Basic | Edit | Finish | Others | Print Quality |

Title: ⟵1010

Character String to Detect
Keyword: Bill
☐ Detect job using keyword and position information
☐ Designate character position   Start character position  1   Number of characters: 1 ⟵1020
⟵1030

Job Name: ⟵1040
⦿ OR detection of keyword and job name   ○ AND detection of keyword and job name Printer
☑ Designate specific printer ⟵1050
Printer Name: OFFICEA_02 ▶
⟵1060

Search Range
⦿ All
○ Designated Page

OK    Cancel

FIG.11

DATA PROCESSING APPARATUS HAVING A PRINTER DRIVER FOR CHANGING AN OUTPUT DESTINATION

CROSS-REFERENCE TO RELATED APPLICATIONS

This application is a Continuation Application of U.S. patent application Ser. No. 13/771,501 filed on Feb. 20, 2013, which is a Continuation Application of U.S. patent application Ser. No. 12/554,045 filed on Sep. 4, 2009, which is based upon and claims the benefit of priority of Japanese Patent Application No. 2008-238561 filed on Sep. 17, 2008, the entire contents of which are incorporated herein by reference.

BACKGROUND OF THE INVENTION

1. Field of the Invention

The present invention relates to a data processing technique and, more particularly, to a technique to control a device to output a document created by an information processing apparatus.

2. Description of the Related Art

In recent years, with the spread of network techniques, personal computers are connected to an image forming apparatus, such as a multi-function peripheral (MFP), a page printer, etc., through a network in many office environments so that print data is sent from the personal computers to the image forming apparatus to have the image forming apparatus perform a printing operation based on the print data. A printer server may be connected to the network so that a printing operation is performed by the image forming apparatus under the control of the printer server.

In the above-mentioned system, each personal computer can be connected to a plurality of image forming apparatuses through the network. In such a case, if there is no problem with respect to a security level and if the output print does not contain secret information such as individual information or personal information, there may be no serious problem if a user of the personal computer mistakenly designates one of the image forming apparatuses, which the user does not intend to use.

On the other hand, in a case where a created document requires a high-level security or a created document contains high-level individual information, there may be a serious problem if a user unintentionally sends a created document data to one of the image forming apparatuses, which is easily accessible by a third person.

This problem is caused by a print wizard of an application for creating a document installed in a personal computer, which print wizard displays a plurality of printer selection icons arranged close to each other on a single screen page. That is, it is possible that a user mistakenly selects a wrong icon to designate an image forming apparatus to be used for printing. As a result, there may be a problem in that, for example, a document to be output by a specific printer is undesirably output by an image forming apparatus, which is set in an open environment.

It is considered that the above-mentioned problem is caused by adoption of architecture by a personal computer, which architecture permits addition of a limitless number of network printers to a network, with the progress in a network technique. There are various techniques to limit an output of an image forming apparatus connected to a network. Japanese Laid-Open Patent Application No. 2003-140867 (Patent Document 1) discloses an information processing apparatus, which is capable of changing an image forming apparatus to be used for printing in accordance with conditions of image forming apparatuses connected to a network. Japanese Laid-Open Patent Application No. 2004-282273 (Patent Document 2) discloses an office section management system, which is capable of limiting and changing output processing requested by other office sections in an image forming apparatus connected to a network.

The information processing apparatus disclosed in Patent Document 1 changes an image forming apparatus to be used for printing in accordance with conditions of image forming apparatuses such as a printing load, a malfunction, etc. However, in a case where an image forming apparatus is in a normal operating condition, an output from the image forming apparatus concerned is not prevented even if the image forming apparatus concerned has been mistakenly selected by a user. In such a case, because a processing speed of a present personal computer is considerably high, it is almost impossible to cancel the print output without outputting at least a part of a document in a case where an undesired image forming apparatus is mistakenly designated.

According to the office section management system disclosed in Patent Document 2, a correspondence table for an image forming apparatus to perform an output control for each office section is previously prepared in order to perform a print output control by identifying an office section from a print request. Patent Document 2 discloses a print control in a system in which a plurality of personal computers uses a single image forming apparatus, but the print control does not aim to control an access by a personal computer when a single personal computer manages a plurality of image forming apparatuses.

Further, in recent years, a so-called thin client, which is a client having a minimum function, has attracted an attention from a view point of a cost performance. The thin client mounts a requisite minimum number of applications, and performs processing using server programs. It is necessary, upon reception of a print request from such a thin client, to properly perform printing without sending print data to an undesired output destination. That is, in a present network print environment in which a personal computer or a thin client is capable of accessing a plurality of image forming apparatuses, it is necessary to provide a data processing apparatus and method to forcibly designate an image forming apparatus, which a user intends to use for printing, even when an operation of an image forming apparatus other than the image forming apparatus, which the user intends to use for printing, is started.

SUMMARY OF THE INVENTION

According to an aspect of the invention, a data processing apparatus comprises: an application configured to create a document and issue a print request of the document; a printer driver configured to receive the print request and create print data by setting a format of the document as a specific format of model dependency, and change a default output destination of the print data into a changed output destination; and a spooler configured to receive the print data and send the print data to one of a plurality of image forming apparatuses designated by the changed output destination through a network interface.

According to another aspect of the invention, a data processing method performed by a data processing apparatus comprises: creating a document and issuing a print request of the document; receiving the print request and creating print data by setting a format of the document as a specific format of model dependency, and changing a default output destination of the print data into a changed output destination; and receiving the print data and sending the print data to one of a plurality of image forming apparatuses designated by the changed output destination through a network interface.

According to a further aspect of the invention, a computer readable recording medium stores a program for causing a computer to perform a data processing method performed by a data processing apparatus, the data processing method comprising: creating a document and issuing a print request of the document; receiving the print request and creating print data by setting a format of the document as a specific format of model dependency, and changing a default output destination of the print data into a changed output destination; and receiving the print data and sending the print data to one of a plurality of image forming apparatuses designated by the changed output destination through a network interface.

According to the invention, when creating a document in association with a specific business, a user of the data processing apparatus can surely output a printed document from an image forming apparatus designated by the user without using a default image forming apparatus, which is normally used by the user, and, thereby achieving a safe and efficient print output.

Other objects, features and advantages of the present invention will become more apparent from the following detailed description when read in conjunction with the accompanying drawings.

BRIEF DESCRIPTION OF THE DRAWINGS

FIG. 5 is an illustration of a data structure of a correspondence table managed by a print data processing part;

FIG. 7 is an illustration of a correspondence table used in the process illustrated in FIG. 6;

FIG. 9 is a flowchart of a process performed by a business server illustrated in FIG. 8;

FIG. 10 is an illustration of a GUI screen for designating an image forming apparatus;

FIG. 11 is an illustration of a GUI screen for automatically assigning an image forming apparatus;

DETAILED DESCRIPTION OF THE PREFERRED EMBODIMENTS

A description will be given below, with reference to the drawings, of embodiments of the present invention.

Figure 1:
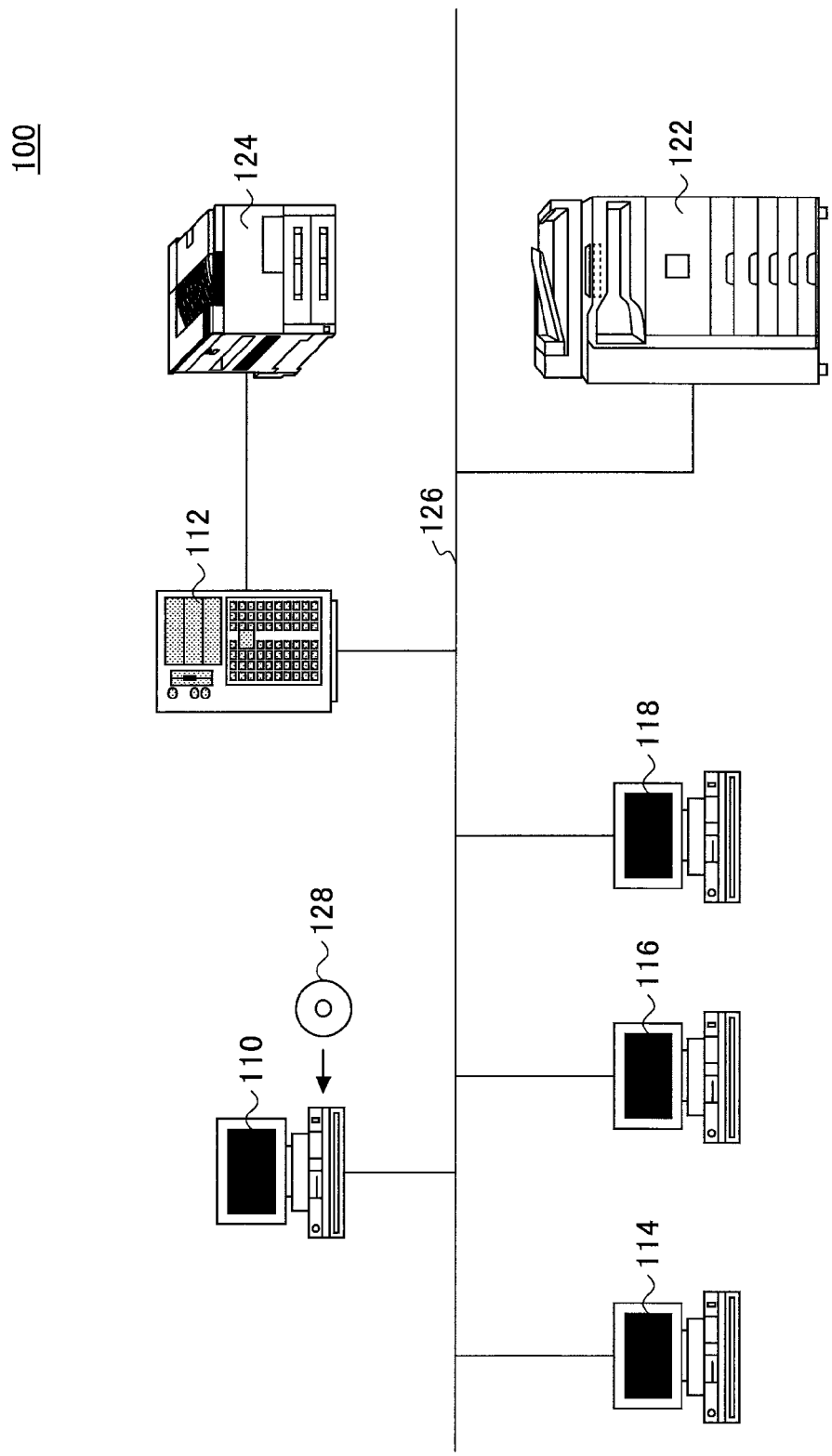
FIG. 1 is an illustration of a printer network including data processing apparatuses according to an embodiment of the present invention.

FIG. 1 illustrates a printer network including data processing apparatuses according to an embodiment of the present invention. The printer network 100 illustrated in FIG. 1 includes a plurality of data processing apparatuses 110, 114, 116, and 118 connected to a network 126 in a business office, business premises or the like. A printer server 112 and a multi-function peripheral (MFP) 122, which is an example of an image forming apparatus, are also connected to the network 126. The data processing apparatuses 110, 114, 116, and 118 output print data to the printer server 112 or the MFP 122 through the network 126. A page printer 124 is connected to and managed by the printer server 112. The page printer 124 performs a print output operation in response to a print request sent from the data processing apparatuses 110, 114, 116 and 118.

Each of the data processing apparatus 110, 114, 116 and 118 can be a fat client apparatus, a personal computer or a work station, which mounts various application programs to complete various processes. Because each of the data processing apparatus 110, 114, 116 and 118 has the same structure except for application programs mounted therein, a description will be given below of the data processing apparatus 110 as a representative. The data processing apparatus 110 includes a single core or multiple core CPU, a RAM, a ROM, a hard disk drive unit, a network interface card (NIC), etc. The data processing apparatus 110 requests the MFP 122 or the page printer 124 to perform a print process under a suitable operating system (OS) such as Windows (registered trademark), UNIX (registered trademark) and LINUX (registered trademark).

The data processing apparatus 110 creates a document as electronic data containing document data, image data, multimedia data or the like. The creation of a document is performed by the CPU executing an application program and data, which are loaded to the RAM from the hard disk drive unit or the like. The data processing apparatus per se may serve as a server.

The MFP 122 is configured as a so-called network printer, and receives print data created by the data processing apparatus 110 through the network 126. The MFP 122 is provided with a user identification function to identify a user of the MFP 122 (image forming apparatus). The user identification is performed by identification information input from user's IC card or a password input by the user. Hereinafter, information for uniquely identifying a user of the printer network (business system) 100, such as a user ID, a password, etc., may be referred to as identification information. An access control of the MFP 122 is performed based on the identification information.

The printer server 112 manages the page printer 124. The page printer 124 is an image forming apparatus such as a laser printer, an inkjet printer or the like. In the printer network 100 illustrated in FIG. 1, the page printer 124 is connected to the network 126 via the printer server 112. The page printer 124 is connected to the printer server 112 through a bus such as USB or a network card mounted in the page printer 124. The printer server 112 receives print data sent from the data processing apparatus 100, and transfers the print data to the designated page printer 124 to have the page printer 124 perform printing based on the print data.

The network 126 can include an Ethernet (registered trademark) such as 1000Base-TX, an optical network and a radio network specified by a standard such as IEEE 802.11. In the network 126, a bidirectional communication is performed according to a packet communication base on a frame or TCP/IP protocol. The network 126 may include, other than a local area network (LAN), a wide area network such as an Internet under a secure environment according to a virtual private network (VPN) or the like.

Figure 2:
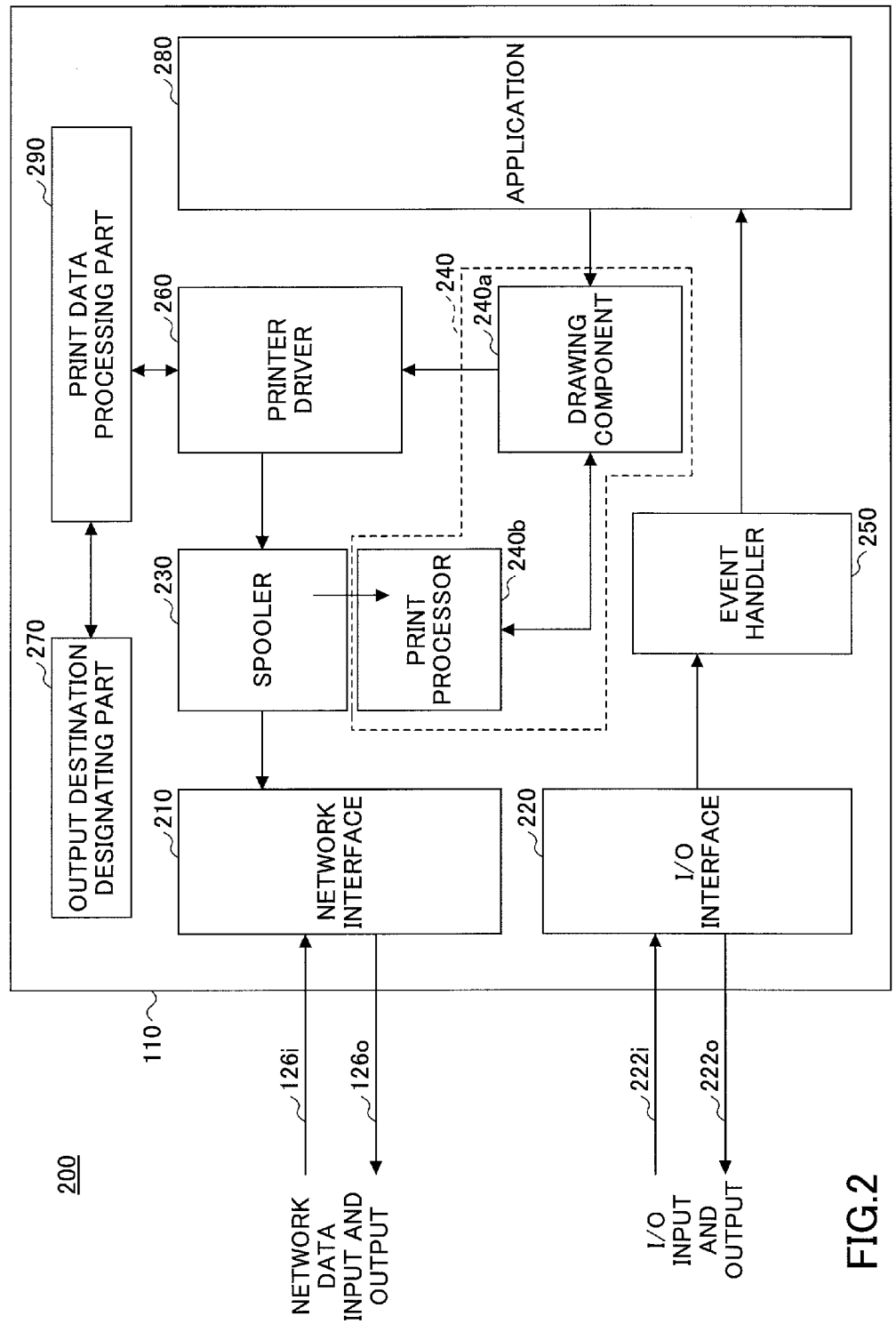
FIG. 2 is a functional block diagram of one of the data processing apparatus illustrated in FIG. 1.

FIG. 2 is a functional block diagram of the data processing apparatus 100 according to the present embodiment. As illustrated in FIG. 2, the data processing apparatus 110 includes a plurality of functional parts or means, which are realized by a computer (CPU) executing a program loaded to the RAM. The program may be read from a computer readable recording medium 128 (refer to FIG. 1) such as a CD-ROM, an SD card, etc., and is stored in the RAM or the ROM of the data processing apparatus 110.

As illustrated in FIG. 2, the data processing apparatus 110 includes a network interface 210 and an I/O interface 220. The network interface 210 receives data based on a TCP/IP protocol or the like through the network 126, and outputs print data or processed data processed by the data processing apparatus 100 through the network 126. The I/O interface 220 receives an input from an inputting device such as a mouse, a keyboard, etc., and sends data and instructions such as an event notification to an application 280 through an event handler 250. The I/O interface 220 causes a display apparatus (not illustrated in the figure) to display a result of execution of an application via a graphics driver or the like in order to provide a user interface.

The application 280 provides the functions of a word processor and an image processing application and other functions. Specifically, the application 280 creates processed data by processing data, which is stored in a RAM or the like, in response to a user instruction. If a user desires to print the processed data created by an execution of the application 280, the user makes a graphical user interface (GUI) provided by the application 280 to display a print wizard in order to select a print menu bar or the like displayed on the GUI to issue a print command.

When a print command is issued, an instance of a format converting part 240 is created, and print data is created with a format specific to an image forming apparatus such as the MFP 122 and the page printer 124. In the example illustrated in FIG. 2, the format converting part 240 includes a drawing component part 240a and a print processor 240b. For example, the format converting part 240 may contain graphics display interface (GDI). If the user issues a print command of the processed data through the application 280, the format converting part 240 calls the drawing component part 240a to create an instance of a drawing component contained in the processed data.

The drawing component part 240a sends a format specific to an application such as image metadata to the print processor 240b in order to change the format into a specific format including raster data, which an image forming apparatus uses. Thus, in one embodiment, the data structure may be registered as a data structure for registering a data value associated with drawing data and a data structure for registering a data value for external transmission.

On the other hand, a text contained in the processed data is sent to the printer driver 260 together with setting of a font, etc. The printer driver 260 performs processing such as setting of a text, setting of a line interval and a character interval, setting of margins, setting of a text arrangement area in order to create a format specific to an image forming apparatus.

The printer driver 260 is capable of creating print data in order to further control the image forming apparatus by describing the page description language such as PDL or PJL in the page description language describing area with respect to image data and the text during or after the above-mentioned processing. In order to create the print data of a format specific to an image forming apparatus, the printer driver 260 sends the created print data to the spooler 230 so that the spooler 230 transfers the data being processed to the format converting part 240a through the print processor 240b and the data is output from the data processing apparatus 110 via the spooler 230 and the port monitor contained in the spooler 23 at a stage of completion of the creation of the print data. The spooler 230 is configured to include the port monitor for sending out the print data in accordance with an output destination of an image forming apparatus. The port monitor of the spooler 230 acquires, from the described data structure, output destination information such as an IP address or a host name of an image forming apparatus to which the print data is sent, and sends the acquired output destination information to the image forming apparatus designated as an output destination through the network interface 210.

Furthermore, the printer driver 260 according to the present embodiment is provided with a print data processing part 290, which is mounted as a program-in-program or an add-in-program. The print data processing part 290 accesses the text or the data managed by an instance of the format converting part 240, when the printer driver 260 is called by the instance of the format converting part 240, in order to replace the text or detect a keyword contained in the text to process various kinds of data managed by the format converting part 240. In the present embodiment, the printer driver 260 detects a keyword contained in the text and changes the output destination of the port monitor by changing (rewriting) the output port name, the host name, the IP address, etc., of an image forming apparatus of the data structure in association with the detected keyword. After changing the output destination, the print data is written in the spooler 230 in order to have the image forming apparatus corresponding to the changed output destination to perform an output operation.

Moreover, the data processing apparatus 110 mounts an output destination designating part 270. The output destination designating part 270 is provided as a functional module of the print data processing part 290. The output destination designating part 270 provides a graphics user interface (GUI) for setting the above-mentioned keyword and registering the output destination information of an image forming apparatus, which is to be changed as the output destination to enable a process of outputting the print data to the image forming apparatus designated by the changed output destination, which is changed from the image forming apparatus registered as a default output destination.

Figure 3:
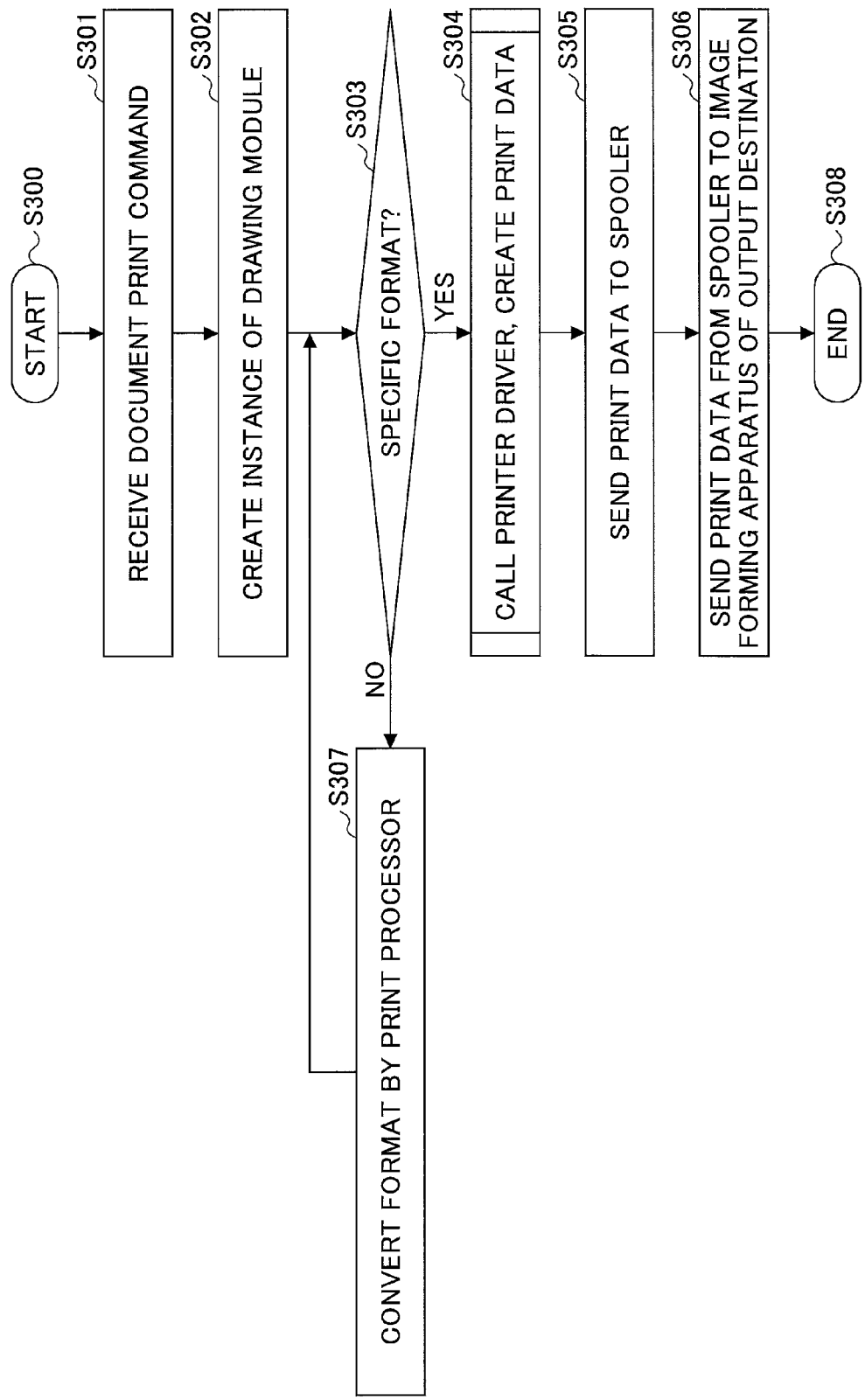
FIG. 3 is a flowchart of a process performed by the data processing apparatus.

FIG. 3 is a flowchart of a process performed by the data processing apparatus 110. The process illustrated in FIG. 3 is started in step S300, and the format converting part 240 receives, in step S301, a document print command from the application 280. In step S302, a GDI instance is created by the format converting part 240. In step S303, it is determined whether image data contained in the document print command has a format in which raster data is set. If it is determined that the format of the image data is not a format in which raster data is set (NO of step S303), the process proceeds to step S307. In step S307, a format conversion is performed by activating the print processor 240b.

On the other hand, if it is determined in step S303 that the format of the image data is a format in which raster data is set (YES of step S303), the process proceeds to step S304. In step S304, the printer driver 260 is called and activated to create print data, and a process of adding page description language and a process of changing (rewriting) the output destination information (address information) are performed. In the process of changing the address information, the address information of an image forming apparatus set in the data structure is changed (rewritten) into the address information of the designated image forming apparatus by referring to an apparatus list managed by the print data processing part 290.

Then, in step S305, the created print data is sent to the spooler 230 in order to send the print data to the designated image forming apparatus. The designated image forming apparatus designated by the process of changing the address information is capable of performing a printing operation without a problem by setting the data structure for setting the image forming apparatus according to a form of an upward compatibility or setting an image forming apparatus, which can share the data structure, to the apparatus list. Then, in step S306, the spooler 230 sends the print data to the designated image forming apparatus through the port monitor by using a protocol such as TCP/IP to request the image forming apparatus to perform printing, and the process is ended in step S308.

Figure 4:
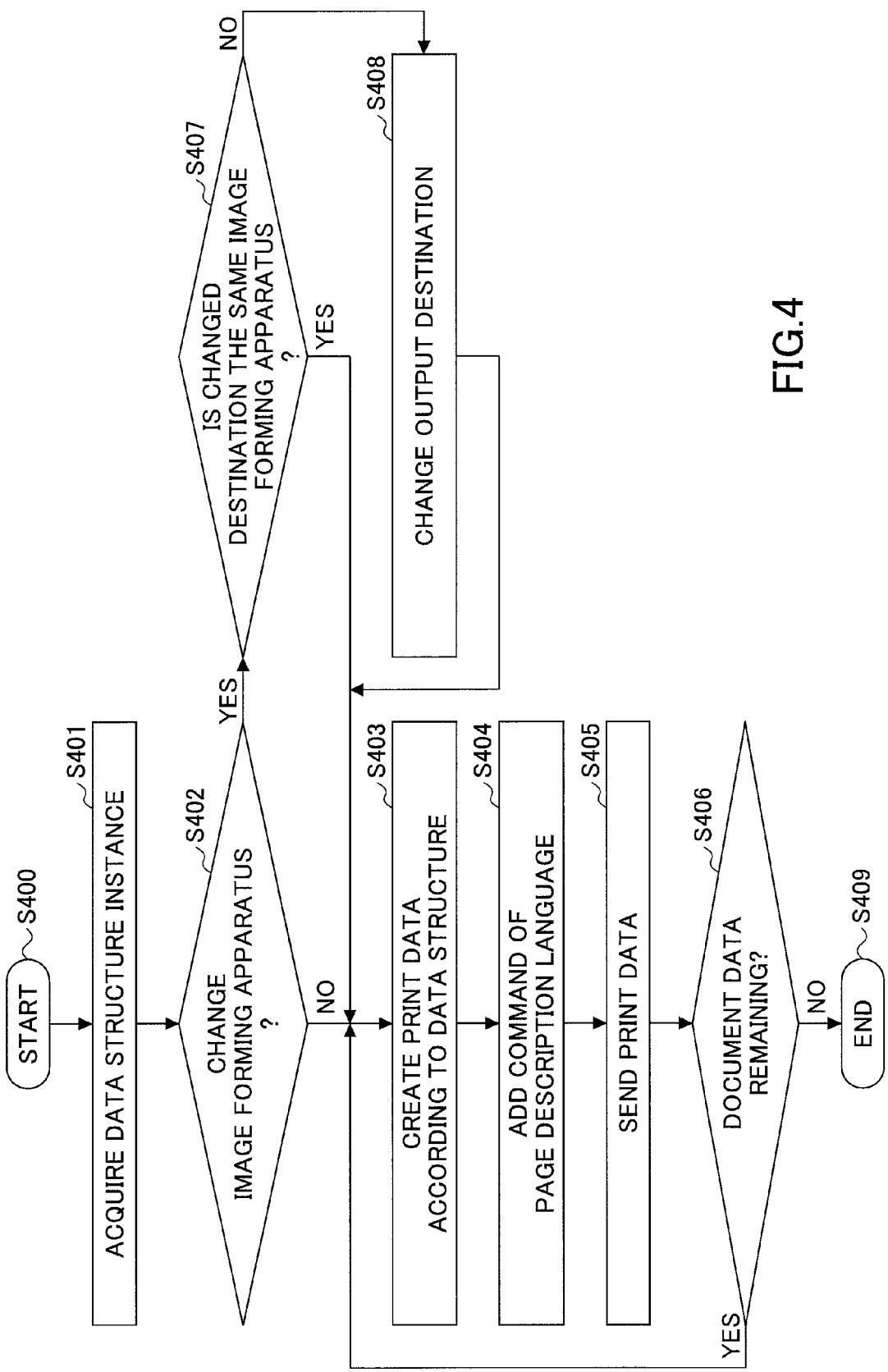
FIG. 4 is a flowchart of a process of step S304 illustrated in FIG. 3.

FIG. 4 is a flowchart of the process of step S304 illustrated in FIG. 3. An execution of the process of FIG. 4 is started in step S400. In step S401, upon reception of the document print command, the instance of the data structure used by the format converting part 240 is created. Then, in step S402, the print data processing part 290 determines whether changing the image forming apparatus is set by examining the setting data. If it is determined in step S402 that changing the image forming apparatus is not set (NO of step S402), the process proceeds to step S403. In step S403, the print data is created according to data set in the data structure. Then, in step S404, a command of a page description language is added. Then, in step S405, the print data is written in the port monitor at a stage where RAW data, which is a format specific to the image forming apparatus, is created. Then, it is determined in step S406, whether document data still remains.

If it is determined in step S406 that document data still remains (YES of step S406), the process returns to step S403 to repeat the process of step S403 through step S406. If it is determined in step S406 that document data does not remain (NO of step S406), the process proceeds to step S409 where the process is ended.

On the other hand, if it is determined in step S402 that changing the image forming apparatus is set (YES of step S402), the process proceeds to step S407. Then, it is determined in step S407 whether the designated image forming apparatus is an image forming apparatus set as a default. If it is determined in step S407 that the designated image forming apparatus is the image forming apparatus set as a default (YES of step S407), the process proceeds to step S403 to create the print data. On the other hand, if it is determined in step S407 that the designated image forming apparatus is not the image forming apparatus set as a default (NO of step S407), the process proceeds to step S408. Then, in step S408, the host name of the instance of the data structure and the corresponding output port are changed (rewritten) into values of the designated image forming apparatus. Thereafter, the process proceeds to step S403 to repeat the process of step S403 through step S406 to create the print data and the created print data is sent to the image forming apparatus.

In the process illustrated in FIG. 4, the setting whether to change the image forming apparatus is performed by a graphics user interface (GUI) provided by the output destination designating part 270, and registered in a flag or a registry setting. In the present embodiment, the image forming apparatus can be changed according to two modes, a first mode and a second mode. In the first mode, if a user designates changing the image forming apparatus, the image forming apparatus is forcibly changed during a period where the output destination is designated as the image forming apparatus set as a default. In the second mode, the output destination of the image forming apparatus, which is to be used, is assigned in accordance with an attribute of a created document.

In the data processing apparatus 110 according to the present embodiment, the printer driver 260 overwrites the default setting of the data processing apparatus by rewriting the output destination of the image forming apparatus, which output destination is set as a default in the data processing apparatus, in order to change the output destination into the image forming apparatus designated by a user and have the designated image forming apparatus to perform an output operation. Thus, the data processing apparatus 110 is capable of eliminating an operation mistake in that a wrong image forming apparatus is erroneously designated and used for outputting by eliminating a selection of an image forming apparatus other than the image forming apparatus set as a default each time a print command is issued. Further, an operation to change the default setting of an image forming apparatus in response to an attribute of a document created by a user each time is eliminated, which enables more efficient execution of a print command.

FIG. 5 is an illustration indicating a data structure of a correspondence table 500 managed by the print data processing part 290. The correspondence table 500 is created at a stage where the print data processing part 290 is plugged into the printer driver 260 and the data structure is examined. If it is determined that condition setting of an image forming apparatus is compatible, attribute values, specifically, a host name and an IP address, are derived, and the attribute values are registered by being related to the image forming apparatus from which the attribute values are derived.

As illustrated in FIG. 5, values for identifying each image forming apparatus are registered in the correspondence table 500. For example, in the example illustrated in FIG. 5, a model name is used as a value for distinguishing whether an image forming apparatus is a multi-function peripheral (MFP) or a page printer (PRT). A host name given to each image forming apparatus is registered in a field 520. An IP address assigned to each image forming apparatus is registered in a field 530. An output port name used when sending print data to each image forming apparatus is registered in a field 540. The host name is used when searching an image forming apparatus using a service advertizing protocol such as in NetBEUI. The IP address is used when sending print data to an image forming apparatus using TCP/IP protocol. The output port name is used as a handle or pointer for calling a device, which sends print data to a set IP address.

If it is determined by the printer driver 260 that changing the image forming apparatus is set, the data processing apparatus 110 acquires the host name and the IP address, which designate the set image forming apparatus. Then, the data processing apparatus 110 reads the host name, the output port name and the IP address, if it is necessary, which are set as defaults in the data structure, and writes these parameters in a predetermined address of the data structure. Then, the printer driver 260 writes the print data in the port monitor contained in the spooler 230 each time the creation of the print data is ended in order to send the print data to the host name and the IP address designated by the output port name. Thereby, the image forming apparatus to be used as an apparatus to output the print data can be changed in response to a keyword contained in a document.

Figure 6:
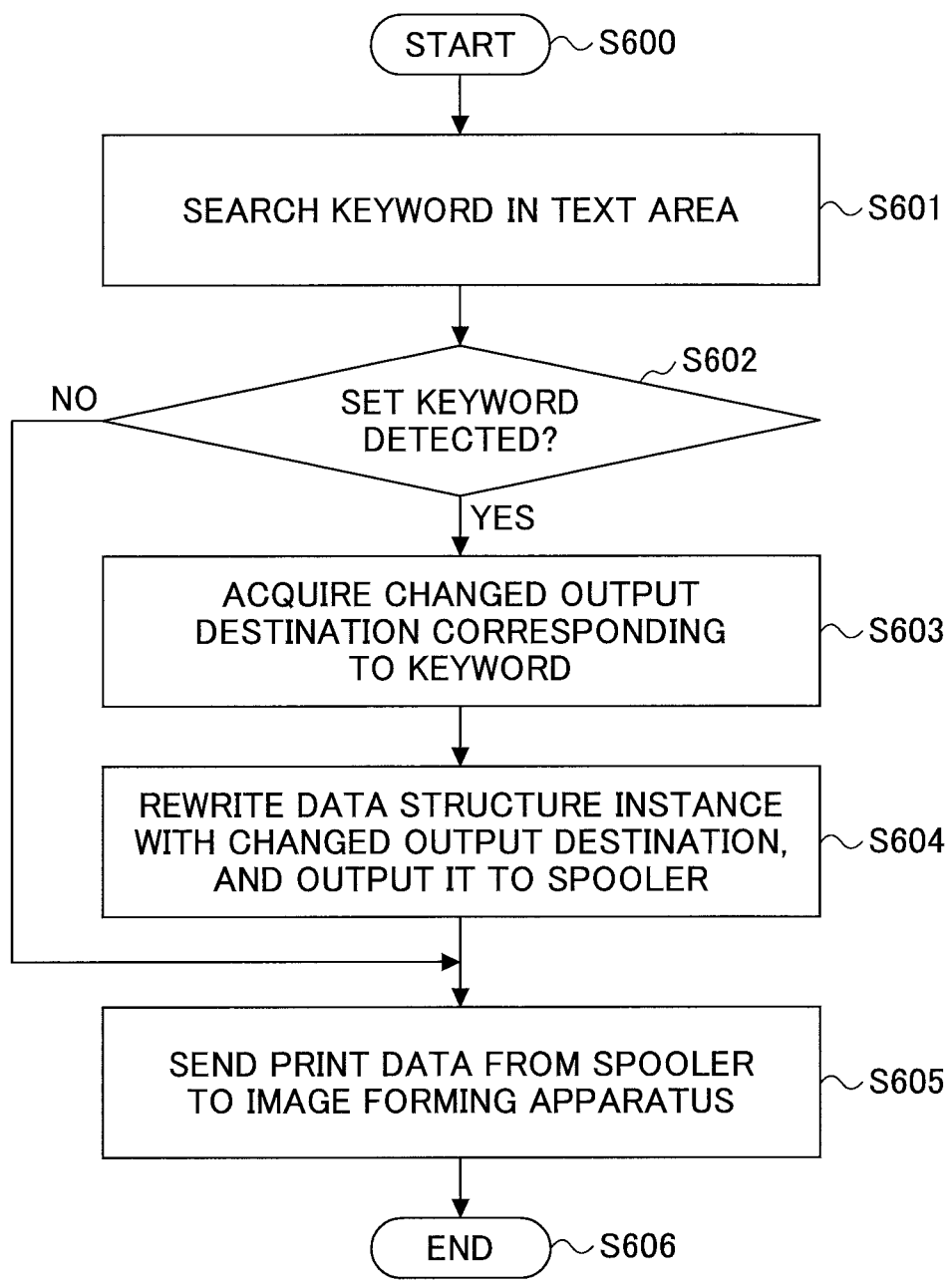
FIG. 6 is a flowchart of a process of changing an image forming apparatus in a case where the change of the image forming apparatus is performed in accordance with a keyword contained in a document.

FIG. 6 is a flowchart of a process of changing an image forming apparatus in a case where the change of the image forming apparatus is performed in accordance with a keyword contained in a document. An execution of the process illustrated in FIG. 6 is started in step S600. In step S601, a search of a text contained in a document is performed to examine whether the text contains a set keyword. Then, in step S602, it is determined whether the set keyword is detected in the text. If the set keyword is detected (YES of step S602), the process proceeds to step S603. Then, in step S603, information regarding the image forming apparatus corresponding to the set keyword is acquired by referring to a correspondence table provided for identifying the keyword and the image forming apparatus.

Then, in step S604, the host name and the output port name of the data structure instance are rewritten using the acquired information of the image forming apparatus. Additionally, in step S604, the print data is written in the port monitor of the spooler 230 in an order of ending a conversion into a format specific to the image forming apparatus. Then, in step S605, the print data is sent to the image forming apparatus, and the process is ended in step S606.

On the other hand, if the set keyword is not detected in step S602 (NO of step S602), the process proceeds to step S605. Then, in step S605, the print data is addressed to the output port name of the image forming apparatus set as a default and written in the port monitor, and the print data is sent to the image forming apparatus set as a default, and, then, the process is ended in step S606.

FIG. 7 is an illustration of the correspondence table 700 used in the process illustrated in FIG. 6. The correspondence table 700 illustrated in FIG. 7 contains a field 710 in which the keyword is registered and fields 720, 730 and 740 in which the identification information of the image forming apparatus is registered. As the identification information of the image forming apparatus, a host name is registered in the field 720, an IP address is registered in the field 730, and an output port name is registered in the field 740. In the data processing apparatus 110, a text contained in a document is searched using the keyword registered in the field 710 of the correspondence table 700 as a searching word. If the searching word of the field 710 is detected in the text of the document, the identification information registered in the corresponding record is acquired. Thereafter, the output destination corresponding to the keyword is designated by overwriting the corresponding address of the data structure instance of the field 720, 730 or 740.

In another example, the correspondence table 700 may be provided with an option field in which a keyword having a priority is registered in a case where a plurality of keywords are detected in the text. If a plurality of keywords are detected in the text, the data processing apparatus 110 selects a keyword having a highest priority by referring to the option field, and applies the selected keyword to the setting process of the image forming apparatus.

Figure 8:
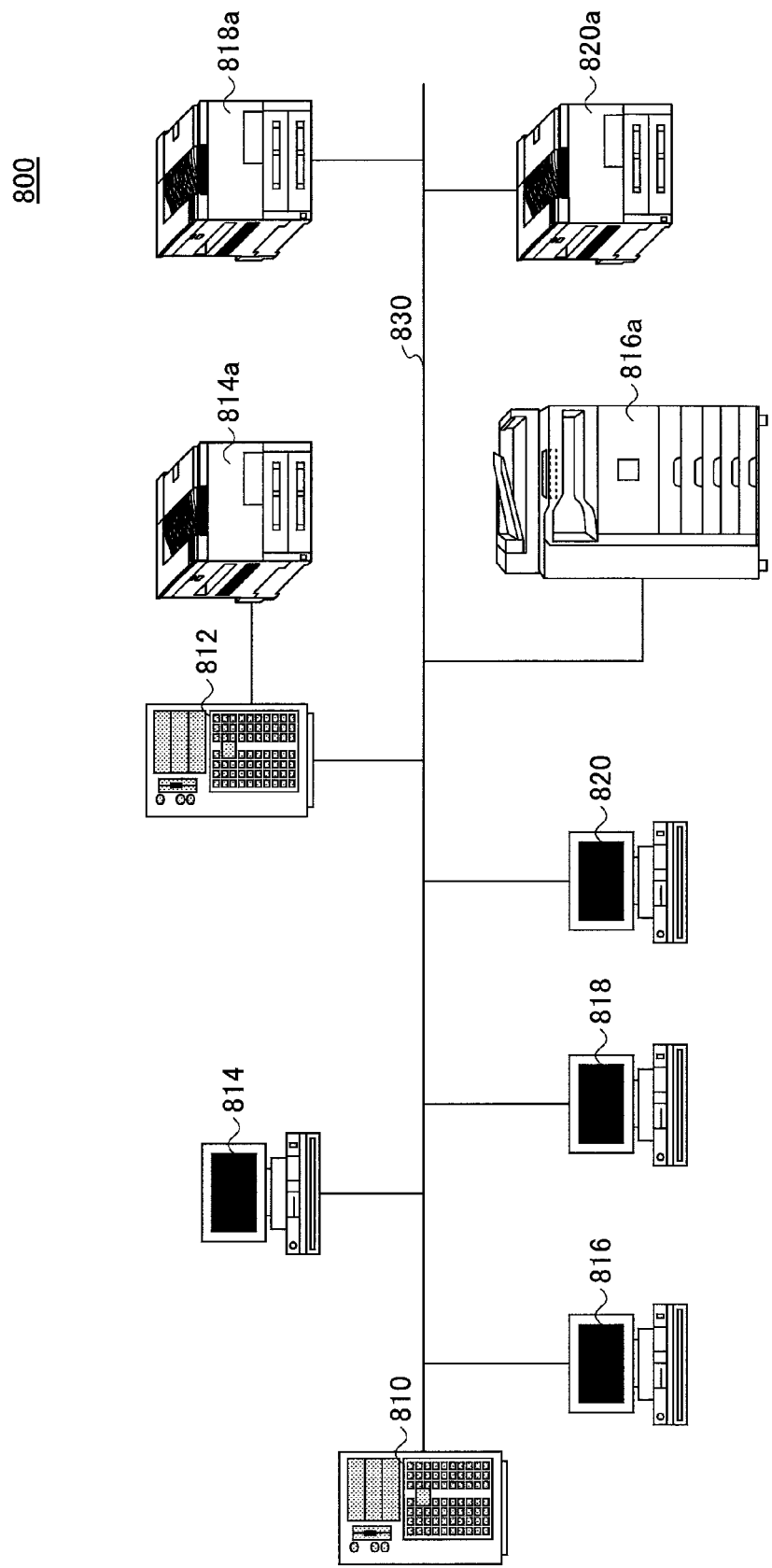
FIG. 8 is an illustration of a network print system according to a second embodiment of the present invention.

FIG. 8 is an illustration of a network print system according to a second embodiment of the present invention. The network print system 800 illustrated in FIG. 8 processes print requests from a plurality of data processing apparatuses 814, 816, 818 and 820 through a network 830 including a local area network (LAN) or the like. The data processing apparatuses 814, 816, 818 and 820 serve as client apparatuses, and, hereinafter, are referred to as client apparatuses. In the present embodiment, the client apparatuses 814, 816, 818 and 820 are mounted as thin client apparatuses. Here, the term "thin client" means a client apparatus, which has a function of calling a business server, activating the server program mounted in the business server, and executing a print command, a send command and a storage command with respect to a document created by the server.

In this respect, the client apparatuses 814 through 820 may be of a type mounting at least a CPU, a BIOS, a RAM, network communication software, and browser software. The client apparatuses 814 through 820 having the above-mentioned structure issue a process request to a business server 810 in order to have a server program of the business server 810 execute a substantial process. The client apparatuses 814 through 820 receive a result of the process from the business server 810, which enables execution of a process which a user desires.

The business server 810 may be configured as a Web server, and may be a client-server-architecture, which performs a process by activating a server program according to a remote method invocation (RMI) by using an exclusive client program. Upon reception of a print command from the client apparatuses 814 through 820, the business server 810 has an image forming apparatus, which corresponds to a specific format designated from the document to the print command, to perform printing.

The printer server 812 receives the print command from the business server 810 together with print data, and automatically assigns the print data to the image forming apparatus assigned to the client apparatus to perform printing. In the second embodiment illustrated in FIG. 8, image forming apparatuses 814a through 820a are assigned to the client apparatuses 814 through 820, respectively. For example, the client apparatuses 814 through 820 have the respective image forming apparatuses 814a through 820a to perform printing. The client apparatuses 814 through 820 may be arranged to form a client group to send a print request to a specific image forming apparatus on an individual group basis.

In the present embodiment, it is assumed that the business server 810 is provided with the function of the data processing apparatus according to the present embodiment. The printer server may serve as the data processing apparatus according to the present embodiment in response to a specific application and a mounting form. For example, when the client apparatus 814 is activated, the client apparatus 814 accesses the printer server 812 to boot a predetermined application, which the client apparatus 814 executes, and sends data to be processed. The transfer of data to be processed can be performed using any known protocols including a known transfer protocol such as, for example, a FTP protocol and an HTTP protocol. A description will be given below, with reference to FIG. 9, of a process performed by the business server 810.

An execution of the business server 810 is started in step S900. In step S901, the business server 810 receives the data to be processed and a business execution request from the client apparatus 814. In step S902, a print request is sent from the client apparatus 814 after the business server 810 completes the requested process. Upon reception of the print request from the client apparatus 814 in step S901, the business server 810 designates the image forming apparatus set as a default and creates an instance of the format converting part 240. The image forming apparatus set as a default may be provided for a business mode in which it is not necessary to assign an image forming apparatus to each client apparatus. Such a business mode in which it is not necessary to assign an image forming apparatus to each client apparatus is a business mode in which it is sufficient to select an image forming apparatus in consideration of a print cost and accessibility to the image forming apparatus when performing printing, for example, at a lowest security level.

The business server 810 acquires, in step S902, an IP address, a client name, or a MAC address, which uniquely identifies the client apparatus 814. Then, the business server 810 acquires, in step S903, the image forming apparatus assigned to the client apparatus 814 by referring to an image forming apparatus assigning table. The image forming apparatus assigning table may be previously prepared by a manager of the business server 810 by registering the client apparatuses and the image forming apparatuses by relating to each other. In step S904, the business server 810 acquires the host name, the output port name, the IP address, etc., of the acquired image forming apparatus, and sets the acquired information as a changed output destination, and performs a format conversion of an image in the document by using print processor 240b.

Thereafter, concurrent with the above-mentioned format conversion, the business server 810 rewrites the output port name, the host name and, if it is necessary, the IP address of the data structure instance. Then, in step S906, the print data is written in the port monitor in an order of ending the image format conversion, and the print data is sent to the printer server 812, which can cause the designated image forming apparatus to output the print data, and, then, the process is ended in step S906. Upon reception of the print data from the business server 810, the printer server 812 activates the printer driver for activating the designated image forming apparatus to have the designated image forming apparatus to output print data.

FIG. 10 is an illustration of a GUI screen for designating an image forming apparatus displayed by the data processing apparatus according to the present embodiment. The GUI screen 1000 is displayed by the data processing apparatus 110 if the data processing apparatus 110 serves as a fat client. If the data processing apparatus 110 serves as a thin client, the GUI screen 1000 is displayed on an management screen of the business server. The GUI screen 1000 is created by the print data processing part 290 added as a plug-in program, which is mounted as a property designation wizard of the image processing apparatus. In the GUI screen, a tab "keyword" indicating an execution of a print control using a keyword in a print process is displayed. A user can designate an image forming apparatus to be set as an output destination by selecting the tab "keyword" to have a keyword setting and the keyword to appear on the GUI screen 1000.

The GUI screen 1000 is provided with an input field 1010 for designating a title to identify the correspondence table illustrated in FIG. 5 or FIG. 7. Although it is not always needed to give a title to the correspondence tables 500 and 700, the correspondence tables 500 and 700 are registered with a title in order to select a priority level from a different GUI screen as mentioned later.

The GUI screen 1000 is provided with an input field 1020 for a user to designate a keyword. In the example illustrated in FIG. 10, a bill is set to the keyword in the input field 1020. The GUI screen 1000 is also provided with an input field for setting a name of a print job. The name of the print job is set as an option. For example, if a text of a document does not contain a designated keyword but contains a keyword set in the job name, an execution of a process to change the image forming apparatus is permitted.

The GUI 1000 is provided with radio button 1040. The radio button 1040 is provided for setting a logical formula expressing a relationship between a job name and a keyword as a utility of a case where the print job name is set as a search key. A user is permitted to designate an OR search or an AND search with respect to a keyword and a print job name in accordance with a specific purpose. If a user does not designate a job name, an OR search is set as a default setting.

The GUI 1000 is provided with an input field 1050 for designating a printer to output in accordance with a designation of a keyword. A check box is provided to the input field 1050 to instruct that a user designates an image forming apparatus used as an output apparatus. If a user checks the check box, the display of the input field 1050 is changed from a grayout state to a normal state to permit an input thereto. If a user checks a check box of "designate a specific printer", the input field 1050 is turned active, and a host name of image forming apparatus currently registered in the data processing apparatus 110 is displayed in the input field 1050.

The GUI 1000 is further provided with a radio button 1060 for setting a range of a document to be searched. After a user completes all settings and registers the settings by clicking an OK button, the data set in each input field is registered in the correspondence tables 500 and 700, and the setting of an image forming apparatus to the printer driver 260 is completed.

The GUI 1000 illustrated in FIG. 10 provides, for example, a function to forcibly switch from a default image forming apparatus to a single designated image forming apparatus during a period in which an instance of an application is active and until the setting is cancelled. The example illustrated in FIG. 10 is preferably used when, for example, a user of the data processing apparatus 110 performs the same kind of business operation during a designated period such as office hours and a business period. In this example, a default image forming apparatus may be changed each time, but if a setting operation of changing the default image forming apparatus is performed on a case-by-case basis, a designation error or input error tends to occur and the setting must be performed for each print job request. However, the present embodiment permits the image forming apparatus setting information to be registered continuously as a printer property, which can improve business efficiency.

Figure 11:
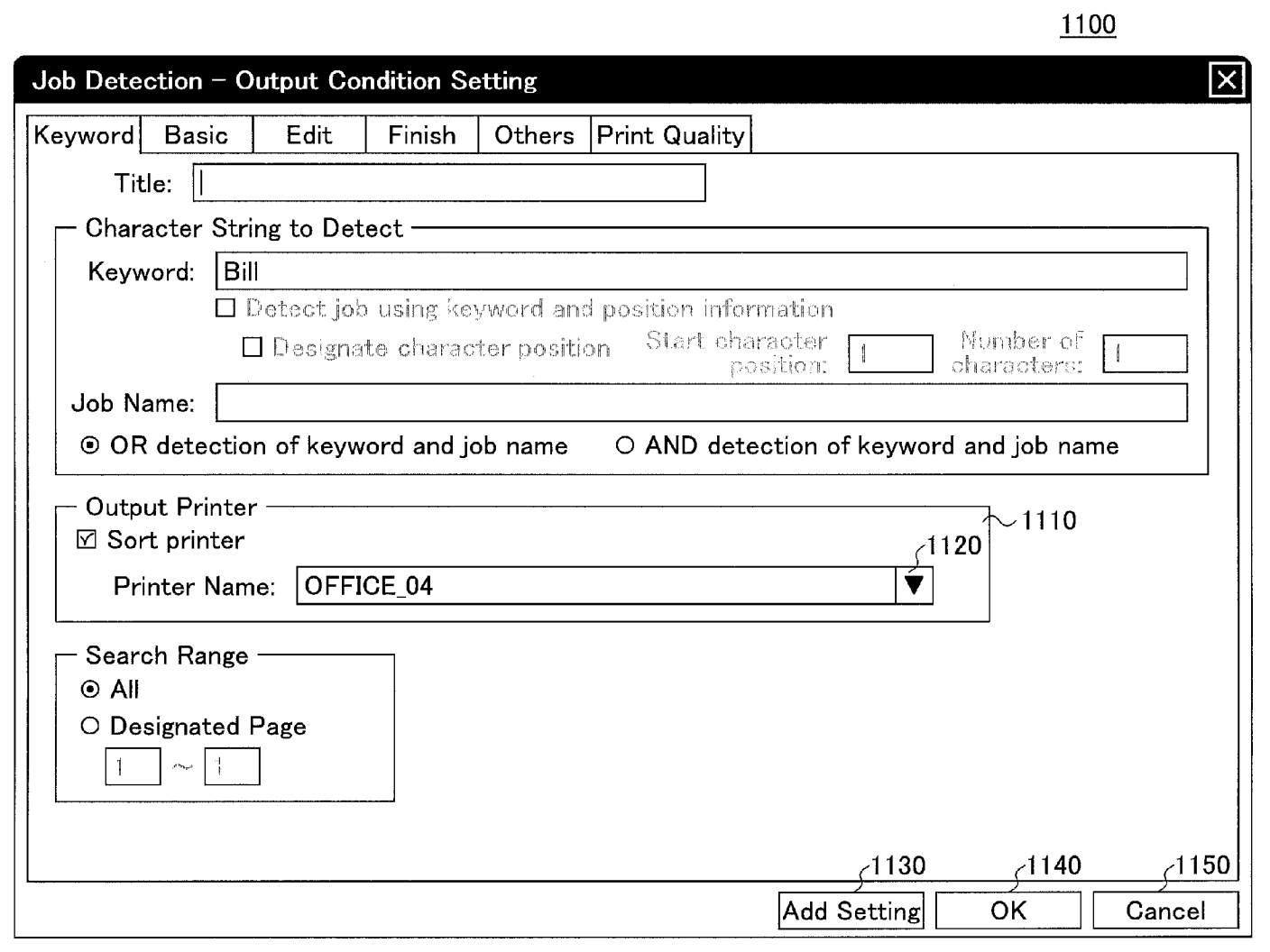

FIG. 11 is an illustration of a GUI screen for automatically assigning an image forming apparatus displayed by the data processing apparatus according to the present embodiment. The GUI screen 1100 illustrated in FIG. 11 is displayed by the print data processing part 290. The GUI screen 1100 is provided with an input field 1110 for designating an image forming apparatus as a destination designated by automatic assignment of an image forming apparatus to be used for print output. If a user checks a check box of "Assign printer", a host name of an image forming apparatus to be designated is displayed in a field 1120 in a form of a pull-down list.

A user inputs a host name of an image forming apparatus through the input field 1120. If there is a keyword and another image forming apparatus to be designated, the user clicks an "Add Setting" button 1130 to register in the correspondence table 700 the setting values currently displayed on the GUI screen 1100, and, thereafter, a new setting screen (GUI screen) in which each input field is reset, is displayed. After completion of all settings, the user clicks an "OK" button 1140 to notify the data processing apparatus 110 of the completion of the setting. If the user wishes to return to a previous state, the user may click a "Cancel" button 1150 to send a notification to the data processing apparatus 110.

In the example illustrated in FIG. 11, the keyword and the job name may be continuously retained as environmental parameters of the printer driver while the instance of the application is active, or may be set as environmental parameters specific to a printer driver class. For example, if the business server 810 is used, the keyword and the job name may be set as continuous environmental parameters, which permits an efficient execution of print management by a thin client terminal. On the other hand, if a fat client terminal is used, the keyword and the job name may be set as environmental parameters retained during an active period of an instance of a specific application, which eliminates an instruction of changing an image forming apparatus for each print command in a case of performing a continuous operation such as, for example, a bill printing operation.

Although the GUI screen 1100 illustrated in FIG. 11 is used in a case where an image forming apparatus to be used for printing is assigned for each keyword, the GUI screen 1100 may be used as a GUI screen for assigning an image forming apparatus to each client apparatus by changing the input field for setting a keyword into an input field for setting an identification value of a client apparatus or an identification value of a group of client apparatuses. In such a case, designation of the present apparatus or the group of client apparatuses may be made using a pull-down list or the like.

Figure 12:
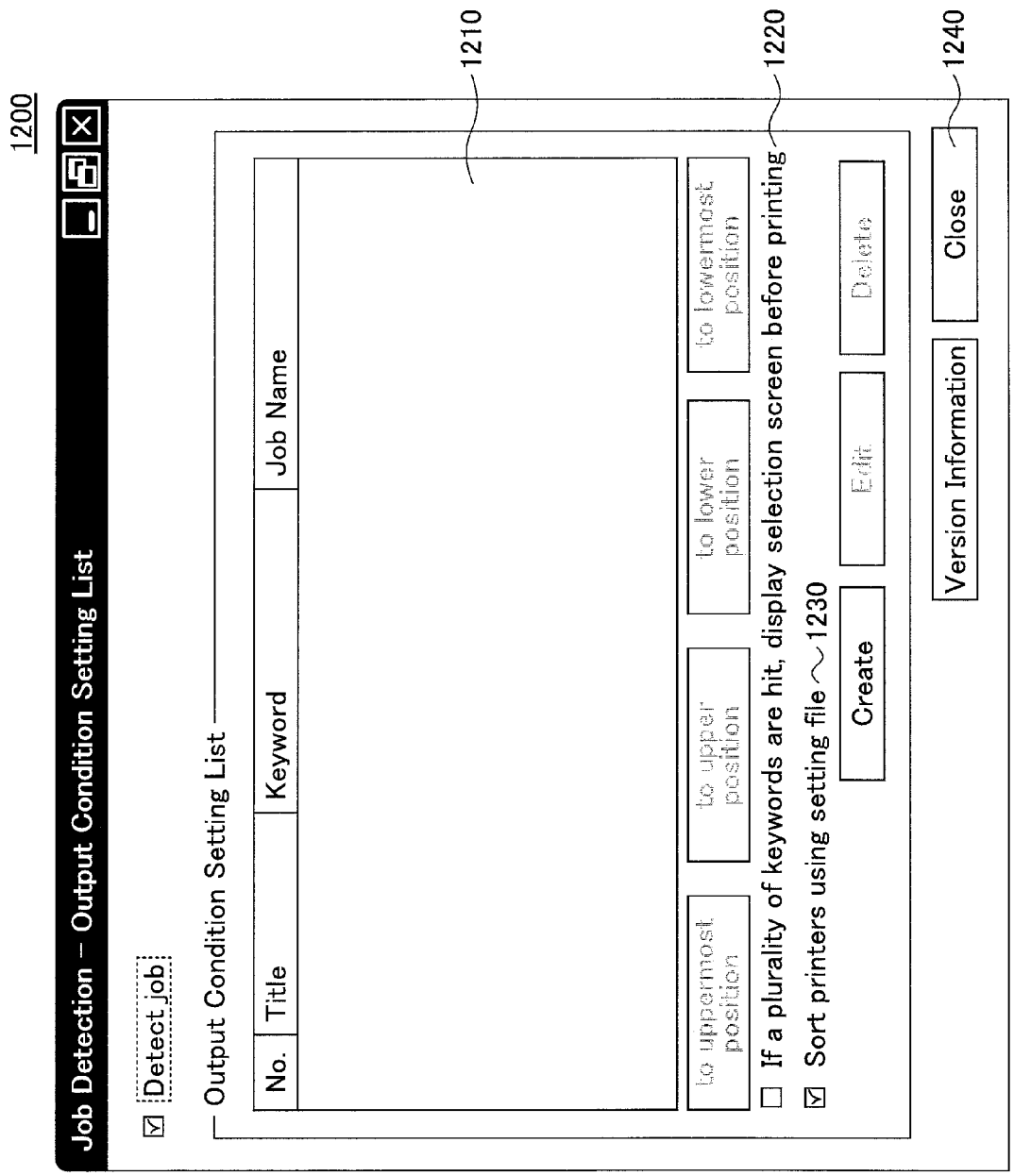
FIG. 12 is an illustration of a GUI screen when using a job name as a search key in a setting operation using the GUI screen illustrated in FIG. 10.

FIG. 12 is an illustration of a GUI screen when using a job name as a search key in the setting operation using the GUI screen 1000 illustrated in FIG. 10. The GUI screen 1200 illustrated in FIG. 12 is displayed for setting a process if a plurality of keywords are detected when designating a job detection. The GUI 1200 is provided with a list field 1210 for listing conditions of assigning image forming apparatus and check boxes 1220 and 1230 for performing various settings with respect to the assigning conditions displayed in the list field 1210. The check box 1220 provides an option to display a selection screen before printing if a plurality of keywords are detected so that a user can check and designate the output destination.

The check box is provided for selecting an option to assign an image forming apparatus by using a setting file without checking the setting. If a user checks the check box 1230, a GUI screen for creating a setting file is displayed so that further detailed conditions can be set in a case where a plurality of keywords are detected. After performing each option setting, the user clicks a "Close" button 1240 to end the property setting of the printer driver.

Figure 13:
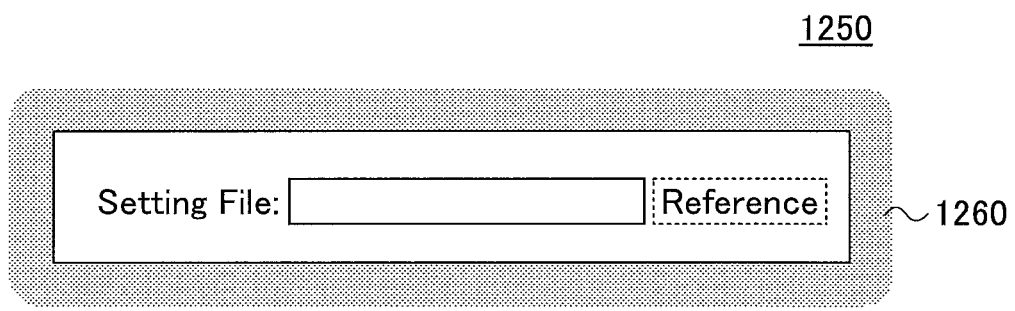
FIG. 13 is an illustration of a GUI screen displayed when a creation of a setting file is designated through the GUI screen illustrated in FIG. 12.

FIG. 13 is an illustration of a GUI screen displayed when a creation of a setting file is designated through the GUI screen 1200. The GUI screen 1250 illustrated in FIG. 13 permits editing of an existing setting file. An existing setting file can be designated through the GUI screen 1250 to edit the existing setting file. A name of a new setting file can also be input through the GUI screen 1250 to create the new setting file.

The above-mentioned GUIs can be provided as a setting wizard of a printer property provided by the printer driver 260 mounted in the data processing apparatus 110 or the business server 810. When performing a setting by selecting a "Property" button of the printer driver 260, a user can optionally set an execution of a print process using a designation of an image forming apparatus. The setting can be registered in a register memory or registered as resource data specifically managed by the printer driver 260. Thus, the setting can be registered as continuous environmental parameters, which are not changed until the setting is cancelled by a user or a manager.

As mentioned above, according to the above-mentioned embodiments, a data processing apparatus, a data processing method, a data processing program and a recording medium storing the data processing program can be provided, which can automatically assign a print job by forcibly designating an image forming apparatus designated by a user, which image forming apparatus is not an unintended image forming apparatus, under a present network print environment in which a personal computer and a thin client are permitted to access a plurality of image forming apparatuses.

The functions in the above-mentioned embodiments can be realized by a computer executable program described in an object oriented programming language such as C, C++, C#, Java (registered trademark), etc. Such a program can be distributed by storing in a computer readable recording medium such as a hard disk drive unit, a CD-ROM, an MO, A flexible disk, a EEPROM, a EPROM, etc., or distributed in a computer readable form through a network.

The present invention is not limited to the specifically disclosed embodiments, and variations and modifications may be made without departing from the scope of the present invention.

What is claimed is:

1. A data processing apparatus communicable with a plurality of client apparatuses and a plurality of image forming apparatuses via a network, comprising:
    a receiving unit configured to receive a print request that requests printing of a document and is issued from one of the plurality of client apparatuses;
    an acquiring unit configured to acquire a client identification value that is included in the print request received by the receiving unit and identifies the one of the plurality of client apparatuses;
    a first storing unit configured to store a plurality of client identification values in correspondence with the plurality of image forming apparatuses;
    a first designating unit configured to designate, from the first storing unit, a first image forming apparatus amongst the plurality of image forming apparatuses stored in correspondence with the client identification value acquired by the acquiring unit;
    a creating unit configured to create print data based on the document that is requested by the print request;
    a sending unit configured to send the print data created by the creating unit to the first image forming apparatus designated by the first designating unit;
    a second storing unit configured to store texts in correspondence with the plurality of image forming apparatuses;
    an extracting unit configured to extract a text from the document that is requested by the print request received by the receiving unit; and
    a second designating unit configured to designate, from the second storing unit, a second image forming apparatus amongst the plurality of image forming apparatuses stored in correspondence with the text extracted by the extracting unit,
    wherein the sending unit sends the print data created by the creating unit to the second image forming apparatus designated by the second designating unit.

2. The data processing apparatus as claimed in claim 1, wherein the creating unit creates the print data in which a format of the document that is requested by the print request is unique and dependent on a model of the first image forming apparatus designated by the first designating unit.

3. The data processing apparatus as claimed in claim 1, wherein the receiving unit receives the print request that is issued from a fat client apparatus or a thin client apparatus.

4. The data processing apparatus as claimed in claim 1, wherein the print data created by the creating unit includes a page description language with respect to image data of the document and the text extracted by the extracting unit.

5. A data processing method to process data in a data processing apparatus that is communicable with a plurality of client apparatuses and a plurality of image forming apparatuses via a network, comprising:
    receiving a print request that requests printing of a document and is issued from one of the plurality of client apparatuses;
    acquiring a client identification value included in the print request received by the receiving;

first storing, in a first storing unit, a plurality of client identification values in correspondence with the plurality of image forming apparatuses;

first designating, from the first storing unit, a first image forming apparatus stored in correspondence with the client identification value acquired by the acquiring unit;

creating print data based on the document requested by the print request;

sending the print data created by the creating to the first image forming apparatus designated by the first designating;

second storing, in a second storing unit, texts in correspondence with the plurality of image forming apparatuses;

extracting a text from the document that is requested by the print request received by the receiving; and second designating, from the second storing unit, a second image forming apparatus amongst the plurality of image forming apparatuses stored in correspondence with the text extracted by the extracting, wherein the sending sends the print data created by the creating to the second image forming apparatus designated by the second designating.

6. The data processing method as claimed in claim 5, wherein the creating creates the print data in which a format of the document that is requested by the print request is unique and dependent on a model of the first image forming apparatus designated by the first designating.

7. The data processing method as claimed in claim 5, wherein the receiving receives the print request that is issued from a fat client apparatus or a thin client apparatus.

8. The data processing method as claimed in claim 5, wherein the print data created by the creating includes a page description language with respect to image data of the document and the text extracted by the extracting.

9. A non-transitory computer-readable recording medium storing a program which, when executed by a computer of a data processing apparatus that is communicable with a plurality of client apparatuses and a plurality of image forming apparatuses via a network, causes the computer to perform a process comprising:

receiving a print request that requests printing of a document and is issued from one of the plurality of client apparatuses;

acquiring a client identification value included in the print request received by the receiving;

first storing, in a first storing unit, a plurality of client identification values in correspondence with the plurality of image forming apparatuses;

first designating, from the first storing unit, a first image forming apparatus stored in correspondence with the client identification value acquired by the acquiring;

creating print data based on the document requested by the print request;

sending the print data created by the creating to the first image forming apparatus designated by the first designating;

second storing, in a second storing unit, texts in correspondence with the plurality of image forming apparatuses;

extracting a text from the document that is requested by the print request received by the receiving; and second designating, from the second storing unit, a second image forming apparatus amongst the plurality of image forming apparatuses stored in correspondence with the text extracted by the extracting, wherein the sending sends the print data created by the creating to the second image forming apparatus designated by the second designating.

10. The non-transitory computer-readable recording medium as claimed in claim 9, wherein the creating creates the print data in which a format of the document that is requested by the print request is unique and dependent on a model of the first image forming apparatus designated by the first designating.

11. The non-transitory computer-readable recording medium as claimed in claim 9, wherein the receiving receives the print request that is issued from a fat client apparatus or a thin client apparatus.

12. The non-transitory computer-readable recording medium as claimed in claim 9, wherein the print data created by the creating includes a page description language with respect to image data of the document and the text extracted by the extracting.

* * * * *